United States Patent [19]

Tsunematsu

[11] Patent Number: 6,068,825
[45] Date of Patent: May 30, 2000

[54] METHOD FOR THE PREPARATION OF A HIGH-QUALITY POWDER OF AMORPHOUS SILICIC ACID

[75] Inventor: Shuji Tsunematsu, Tosu, Japan

[73] Assignee: Japan as represented by Director General of Agency of Industrial Science and Technology, Japan

[21] Appl. No.: 09/213,376

[22] Filed: Dec. 17, 1998

[30] Foreign Application Priority Data

Jul. 15, 1998 [JP] Japan ................................. 10-218548

[51] Int. Cl.⁷ ..................................................... C01B 33/12
[52] U.S. Cl. ............................................. 423/335; 423/339
[58] Field of Search ..................................... 423/335, 339

[56] References Cited

U.S. PATENT DOCUMENTS 4,678,652  7/1987  Tamenori et al. .
5,370,852  12/1994  Ikawa et al. .

FOREIGN PATENT DOCUMENTS 59-141414  8/1984  Japan .

*Primary Examiner*—Steven P. Griffin
*Assistant Examiner*—Christina Ildebrando
*Attorney, Agent, or Firm*—Wenderoth, Lind & Ponack, L.L.P.

[57] ABSTRACT

Disclosed is an improvement in the process for the preparation of amorphous silicic acid particles useful, for example, as a filtration aid comprising the steps of a hydrothermal reaction to prepare calcium silicate particles and decalcification of the calcium silicate particles, after or without undertaking carbonation by the reaction of carbon dioxide, with an acid to form particles of amorphous silicic acid followed by drying of the amorphous silicic acid particles. Different from the conventional methods in which great shrinkage of the amorphous silicic acid cakes wet with water is unavoidable in the drying step to adversely affect the quality of the product, the final step of treatment preceding drying of the wet cake is undertaken in a liquid medium which is a mixture of water and a water-miscible organic solvent such as ethyl alcohol in a specified proportion so that the drying of the wet cake is performed without the disadvantage due to the large surface tension of water responsible to the drying shrinkage of wet cakes.

9 Claims, No Drawings

METHOD FOR THE PREPARATION OF A HIGH-QUALITY POWDER OF AMORPHOUS SILICIC ACID

BACKGROUND OF THE INVENTION

The present invention relates to a method for the preparation of a high-quality powder of amorphous silicic acid or, more particularly, to an efficient method for the preparation of a high-quality amorphous silicic acid in the form of a powder having usefulness as an adjuvant ingredient in various kinds of cosmetic and toiletry preparations, as a carrier material of a catalyst used in a chemical reaction to support the catalytically active ingredient thereon and as a filtration aid capable of having a high filtration coefficient in the process of solid-liquid separation by virtue of the high acid resistance, high whiteness and large specific surface area.

It is an established chemical engineering technology in the prior art that, in conducting solid-liquid separation by filtration of a liquid suspension containing suspended fine particles which may readily cause clogging of the filtering material, e.g., filter paper and filter cloth, or a suspension of which the suspended particles are extremely fine and the concentration thereof in the suspension is very low, a filtration aid in the form of a fine powder, which typically consists of a diatomaceous earth, is used by adding to the suspension to be filtered or by forming a coating layer on the filtering material with an object to increase the rate of filtration or to increase the clarity of the filtrate obtained by filtration.

Since diatomaceous earth is a naturally occurring mineral product, the diatomaceous earth-based filtration aids are greatly diversified in the types and grades relative to the particle diameter, crystallite morphology and other characteristics to exhibit a large difference in the filtration behavior. Accordingly, it is usual that a very strict and precise quality control is essential in the manufacturing process of a diatomaceous earth-based filtration aid including the steps of pulverization, particle size classification and the like unavoidably leading to an increase in the manufacturing costs.

Moreover, some countries in the world have a problem relative to the resource abundance and quality of the ore beds of diatomaceous earth not to ensure stable supply of high-quality diatomaceous earth products as a base material of filtration aids. In addition, as an inherence of a naturally deposited mineral product, diatomaceous earth always contains a considerable amount of impurities including organic matters and ferrous matters so that the applicability of a diatomaceous earth-based filtration aid is more or less limited in the field of the pharmaceutical industry. Accordingly, it is almost always necessary that a diatomaceous earth-based filtration aid is subjected to an elaborate pretreatment in order to minimize contamination of the material filtered therewith by an organic matter originating in the filtration aid. The ferrous impurities are particularly undesirable in the filtration aids used in the food industry and petroleum industry in view of the unavoidable coloring of the products by the ferrous impurities.

On the other hand, extensive investigations are now under way for the use of calcium silicate particles obtained by a hydrothermal reaction of a siliceous material and a calcific material as a filtration aid. Although calcium silicate products have a well controlled particle diameter and crystalline morphology suitable for a particular application by adequately selecting the preparation conditions even without undertaking expensive procedures of pulverization and particle size classification and also can be free from organic and ferrous impurities by using appropriate starting materials, a most serious problem in the calcium silicate-based filtration aids is their low acid resistance which limits their use under an acidic condition.

In view of the above described problems in the calcium silicate-based filtration aids in the prior art, the inventor has disclosed, in Japanese Patent Kokai 7-206423 and 8-245215, an improved method for the preparation thereof in which a siliceous material and a calcific material are blended in a specified proportion and the blend is subjected to a hydrothermal reaction to form calcium silicate which is subjected to a heat treatment at a temperature in the range from 800 to 1200° C., and, in Japanese Patent Kokai 8-245215 and 9-255323, a method in which a calcium silicate powder obtained by a hydrothermal reaction is subjected to a carbonation treatment followed by a treatment in an acidic aqueous solution. The inventor has further developed a method for the preparation of a calcium silicate-based filtration aid in which an aqueous slurry of calcium silicate particles obtained by a hydrothermal reaction under specified conditions is admixed with an acid to effect decalcification of the calcium silicate particles.

Further, Japanese Patent Kokai 51-125699 discloses a method in which calcium silicate particles are subjected to a carbonation reaction to effect a decomposition reaction thereof into amorphous silicic acid and calcium carbonate followed by an acid treatment to dissolve away the calcium carbonate leaving amorphous silicic acid as a solid product.

A serious problem in the above described method is that, when a wet particles of the amorphous silicic acid obtained by the decalcification treatment are dried, the wet cake of the particles greatly shrinks and is consolidated so that an amorphous silicic acid powder retaining a highly porous structure, suitable for use as a filtration aid, can no longer be obtained. The mechanism for the drying shrinkage of the amorphous silicic acid cake is presumably that, when the calcium silicate obtained by the hydrothermal reaction is treated with an acid to dissolve away the calcific constituent to form amorphous silicic acid, highly hydrophilic silanolic hydroxyl groups are formed which combine a large amount of water onto the silicic acid particles so that, when the water is removed by evaporation in the drying step, a very large coherent force of several hundreds of $kg/cm^2$ due to the large surface tension of water acts between the secondary particles or between the primary particles forming the secondary particles of the amorphous silicic acid resulting in shrinkage and consolidation of the wet cake of amorphous silicic acid particles.

The above mentioned problem of shrinkage of a wet cake of the amorphous silicic acid particles by drying can be partly solved by repeatedly washing the wet particles with acetone before drying. The shrinkage-preventing effect of this method, however, is far from complete and, when the starting calcium silicate has particularly low crystallinity, the amorphous silicic acid obtained therefrom has a great specific surface area so that the effectiveness of the method is very limited if not to mention the economical problem due to the costs for the use of a large volume of expensive acetone.

As an alternative method for drying a wet cake of amorphous silicic acid particles, an aqueous slurry of the particles is subjected to spray drying. This method, however, is economically very disadvantageous because the spray nozzle of the spray drier is readily clogged by the particles unless the solid content of the aqueous slurry is unduly low to be, for example, 2 to 3% by weight necessitating consumption of a very large quantity of thermal energy for evaporation of water.

SUMMARY OF THE INVENTION

The present invention accordingly has an object, in view of the above described problems in the prior art methods for the preparation of amorphous silicic acid particles, to provide an efficient and economical method for the preparation of high-quality amorphous silicic acid particles having high whiteness and a large specific surface area and capable of giving a large filtration coefficient when used as a filtration aid by solving the most serious problem of drying shrinkage of a wet cake of amorphous silicic acid particles.

Thus, the inventive method according to the first aspect of the present invention for the preparation of amorphous silicic acid particles comprises the steps of:
(a) subjecting a mixture of a siliceous material and a calcific material to a hydrothermal reaction in an aqueous medium to form an aqueous slurry of calcium silicate particles;
(b) bringing the calcium silicate particles into contact with a liquid medium, which is a mixture of water and a water-miscible organic solvent, containing an acid to effect decalcification of the calcium silicate particles leaving amorphous silicic acid particles; and
(c) separating the amorphous silicic acid particles from the acidic liquid medium.

According to the second aspect of the invention, the method for the preparation of amorphous silicic acid particles comprises the steps of:
(a) subjecting a mixture of a siliceous material and a calcific material to a hydrothermal reaction in an aqueous medium to form calcium silicate particles;
(b) bringing the calcium silicate particles into contact with carbon dioxide in an aqueous medium to effect carbonation of the calcium silicate particles;
(c) bringing the calcium silicate particles after carbonation in step (b) into contact with a liquid medium, which is a mixture of water and a water-miscible organic solvent, containing an acid to effect decalcification of the calcium silicate particles leaving particles of amorphous silicic acid; and
(d) separating the amorphous silicic acid particles from the liquid medium.

According to the third aspect of the invention, the method for the preparation of amorphous silicic acid particles comprises the steps of:
(a) subjecting a mixture of a siliceous material and a calcific material to a hydrothermal reaction in an aqueous medium to form calcium silicate particles;
(b) bringing the calcium silicate particles into contact with an aqueous medium containing an acid to effect decalcification of the calcium silicate particles leaving amorphous silicic acid particles;
(c) bringing the amorphous silicic acid particles into contact with a liquid medium which is a mixture of water and a water-miscible organic solvent; and
(d) separating the amorphous silicic acid particles from the liquid medium.

DETAILED DESCRIPTION OF THE PREFERRED EMBODIMENTS

In each of the above described methods according to the first to third aspects of the invention, the first step is for the preparation of calcium silicate particles by a hydrothermal reaction between a siliceous material and a calcific material. The procedure of the hydrothermal reaction is rather conventional without particular limitations. Although the scope of the invention is most successfully applied to the calcium silicate particles obtained by the hydrothermal reaction between a siliceous material and a calcific material, various kinds of naturally occurring calcium silicate minerals in the form of a powder can be directly subjected to the second and succeeding steps of treatments. Examples of such natural calcium silicate minerals include: tobermolite, low-crystalline calcium silicate, xonotlite, gyrolite, faujasite, wollastonite, hillebrandite and the like.

In conducting the hydrothermal reaction for the preparation of synthetic calcium silicate particles, a siliceous material and a calcific material are blended in a specified molar ratio of $CaO:SiO_2$ and the blend is heated in an aqueous medium optionally containing an alkali hydroxide at an elevated temperature, usually, under a superatmospheric pressure. Various materials containing siliceous constituent, such as silica stone, quartz, amorphous silica, finely divided silica powders, rice husk ash, fly ash, sodium silicate and the like, can be used as the siliceous starting material either singly or as a combination of two kinds or more. The particle diameter of these siliceous materials is not particularly limitative and can be selected depending on the particular intended application of the amorphous silicic acid particles as the final product. The calcific starting material is typically calcium oxide or calcium hydroxide.

The above mentioned molar ratio of $CaO:SiO_2$ specifying the blending proportion of the starting materials in conducting the hydrothermal reaction is preferably in the range from 0.3 to 1.4. When this molar ratio is too low, a substantial amount of the silicic starting material remains unreacted after the hydrothermal reaction adversely affecting the quality of the final product while, when this molar ratio is too high, the reaction product of the hydrothermal reaction contains unreacted calcific material so that an unduly large amount of an acid is required in the step of decalcification treatment to remove the calcific constituent.

In conducting the hydrothermal reaction, a blend of the silicic and calcific starting materials is suspended in an aqueous medium preferably containing an alkali hydroxide such as sodium hydroxide to form an aqueous slurry. The concentration of the alkali hydroxide is preferably in the range from 0.01 to 1.0 mole/liter in order to promote the hydrothermal reaction and to adequately control the crystalline morphology of the calcium silicate particles. When the silicic starting material contains a large amount of alumina as an impurity, for example, very fine crystalline particles of hydrogarnet sometimes precipitate by the hydrothermal reaction but formation of the hydrogarnet is suppressed by conducting the hydrothermal reaction in an alkaline aqueous medium along with a promoting effect on the hydrothermal reaction. This advantage cannot be fully obtained when the concentration of the alkali hydroxide is lower than 0.01 mole/liter. When the concentration of the alkali hydroxide in the aqueous medium is too high, on the other hand, degradation is resulted in the quality of the amorphous silicic acid particles as the final product. Examples of suitable alkali hydroxides include lithium hydroxide, sodium hydroxide and potassium hydroxide, which can be used either singly or as a combination of two kinds or more according to need.

The amount of the aqueous medium in the aqueous slurry in the hydrothermal reaction is, though not particularly limitative, preferably in the range from 5 to 50 times by weight relative to the total amount of the silicic and calcific starting materials in consideration of the reactivity exhibited in the hydrothermal reaction and the volume efficiency of the reaction vessel therefor.

The hydrothermal reaction is conducted at a temperature in the range from 70 to 190° C., if necessary, by using an autoclave for pressurization. When the reaction temperature is too low, the hydrothermal reaction proceeds only at an unduly low rate not to be practical while the reaction conducted at a too high temperature requires a more pressure-resistant reaction vessel which is necessarily too expensive to be economically advantageous. The hydrothermal reaction proceeds under a spontaneous pressure corresponding to the temperature although forcible pressurization to a super-atmospheric pressure can be undertaken, if necessary. Though not essential, the reaction mixture under the hydrothermal reaction is preferably agitated with a stirrer rotating at an appropriate velocity. The hydrothermal reaction is complete usually within 1 to 100 hours though dependent on the reaction temperature and other factors. By undertaking the hydrothermal reaction under adequate conditions, an aqueous slurry of calcium silicate particles is obtained which can be subjected as such to the second step of the inventive method but it is optional that the calcium silicate particles are freed from most of the aqueous medium by solid-liquid separation and subjected to the treatment in the next step in the form of a wet cake.

In the inventive method according to the first aspect of the present invention, the calcium silicate particles obtained by the hydrothermal reaction are subjected to a decalcification reaction by contacting with an acidic aqueous medium, which is a mixture of water and a water-miscible organic solvent containing an acid, in order to dissolve away the calcific constituent therein as completely as possible. The water-miscible organic solvent, which has an effect of decreasing the surface tension of the aqueous medium, is preferably an organic compound capable of forming an ether linkage or an acyl group such as methyl alcohol, ethyl alcohol, propyl alcohol, butyl alcohol and acetone, of which ethyl alcohol is preferred. These water-miscible organic solvents can be used either singly or as a combination of two kinds or more according to need. The proportion of the water-miscible organic solvent and water in the aqueous medium for the decalcification treatment is preferably in the range from 50:1 to 1:4 by weight although the proportion of water and the organic solvent in the mixture added to the calcium silicate particles should be selected in consideration of various factors including the kind of the acid used for the decalcification treatment, desired morphology of the amorphous silicic acid particles as the final product, content of water contained in the aqueous slurry or wet cake of the calcium silicate particles to be subjected to the decalcification treatment and so on.

The acid contained in the aqueous medium for the decalcification treatment of the calcium silicate particles can be selected from a variety of inorganic and organic acids including hydrochloric acid, nitric acid, acetic acid and the like among those acids which do not form an insoluble or hardly soluble salt with calcium. Other acids, which form an insoluble or hardly soluble salt with calcium, can also be used if the purity of the product relative to silicic acid can be somewhat lower. The amount of the acid contained in the aqueous medium for the decalcification treatment must be sufficient to completely dissolve away the calcific constituent in the calcium silicate particles.

The volume of the acid-containing aqueous medium in the decalcification treatment is not particularly limitative but should be small enough in consideration of the volume efficiency of the reaction vessel and the amount of the relatively expensive organic solvent used therein provided that the slurry of the calcium silicate particles has a consistency suitable for efficient agitation with a stirrer. The concentration of the acid in the acid-containing aqueous medium is also not particularly limitative and can be selected in consideration of the efficiency of the decalcification reaction.

The temperature for the decalcification treatment of the calcium silicate particles is not particularly limitative and the calcific constituent can be fully dissolved away by the decalcification treatment even at room temperature although it is preferable that the slurry under the decalcification treatment is heated at a temperature in the range from 40 to 95° C. with an object to promote the dissolving rate of the calcific constituent into the acidic medium and to enhance the shrinkage-preventing effect on the wet cake of amorphous silicic acid particles in the drying step.

The amorphous silicic acid particles obtained by the decalcification treatment in an acid-containing liquid medium are then separated from most of the liquid medium by a suitable solid-liquid separating method and, after washing with water, if necessary, the wet cake of the amorphous silicic acid particles is dried by heating followed, if desired, by disintegration into a fine powder of discrete particles.

In the inventive method according to the second aspect of the invention, the above described decalcification treatment of the calcium silicate particles is preceded by a carbonation treatment by blowing carbon dioxide gas into an aqueous slurry of the calcium silicate particles for converting the calcific constituent in the aqueous slurry into calcium carbonate so that the calcium silicate is at least partly decomposed into amorphous silicic acid and calcium carbonate. Namely, the carbonation treatment of the calcium silicate has an effect to improve the efficiency of the decalcifying acid treatment in the step to follow.

The carbonation reaction of the calcium silicate particles in an aqueous medium can proceed even at room temperature under atmospheric pressure. It is, however, more advantageous that the carbonation treatment is conducted at an elevated temperature under pressurization with carbon dioxide gas in consideration of the fact that the aqueous slurry of the calcium silicate particles immediately after the hydrothermal reaction is still at a high temperature and contained in a pressurizable vessel of autoclave. By the succeeding decalcification treatment, the calcium carbonate formed in the above described carbonation treatment and the calcific starting material remaining unreacted in the aqueous slurry, if any, are efficiently dissolved away by the acid.

The decalcification treatment of the aqueous slurry after the carbonation treatment can be performed in the same manner as in the method according to the first aspect of the invention. It is essential that the decalcification treatment of the slurry after the carbonation treatment is conducted in a liquid medium which is a mixture of water and a water-miscible organic solvent. The various requirements for the decalcification treatment in the method according to the second aspect of the invention are about the same as those in the method according to the first aspect of the invention. The aqueous slurry containing the amorphous silicic acid particles formed by the decalcification treatment is subjected to a solid-liquid separation by a known method such as centrifugal separation and filtration and the wet cake obtained thereby is, after washing with water, if necessary, dried by heating and disintegrated into a fine powder.

In the inventive method according to the third aspect of the invention, the amorphous silicic acid particles, which may be obtained by a method involving the hydrothermal reaction and the decalcification treatment are further brought into contact with a mixture of water and a water-miscible organic solvent by dispersing a wet cake thereof in the liquid mixture followed by separation from the liquid medium by solid-liquid separation, washing with water, if necessary, and drying.

The amount of the amorphous silicic acid particles dispersed in the liquid medium in this treatment is not particularly limitative but it should be as large as possible relative to the volume of the liquid medium provided that the slurry has a consistency suitable for efficient agitation with a stirrer in consideration of the volume efficiency of the vessel, reduction of the amount of the relatively expensive organic solvent and recovery of the organic solvent from the spent liquid mixture after the treatment. The temperature of this treatment is not particularly limitative but preferably in the range from 40 to 95° C. in order to further improve the shrinkage-preventing effect on the wet cake of the amorphous silicic acid particles.

The amorphous silicic acid particles obtained by the decalcification treatment either after or without undertaking the carbonation treatment in a mixture of water and a water-miscible organic solvent can be directly freed from the liquid medium without washing with water to wash away the calcific matter, dried and subjected to particle size classification to give a high-quality product of amorphous silicic acid powder.

Though optional, the amorphous silicic acid particles obtained by the above described method can be subjected to calcination at a temperature in the range from 200 to 1400° C. with an object to modify the particle morphology, crystalline structure and specific surface area according to need.

The amorphous silicic acid particles obtained by the inventive method usually have a whiteness of 96.5% or higher and a specific surface area of at least 200 m$^2$/g or, in some cases, at least 600 m$^2$/g as well as a high constant-pressure filtration coefficient of 0.5 to 0.97 cm$^2$/second.

As is understood from the above given description, the most characteristic feature of the inventive method consists in the use of a mixture of water and a water-miscible organic solvent as a liquid medium in the step preceding solid-liquid separation of the silicic acid particles involved in the process for the preparation of amorphous silicic acid particles from calcium silicate particles so as to efficiently prevent drying shrinkage of the wet cake of amorphous silicic acid particles. Thus, a high-quality amorphous silicic acid product can be obtained within a short time by the inventive method which is rather more convenient and simpler than conventional methods.

The amorphous silicic acid products obtained by the inventive methods are free from organic and ferrous impurities to exhibit high whiteness and are highly porous to have a large specific surface area comparable with that of silica gels. Accordingly, the amorphous silicic acid products can be used in various applications as a carrier of catalysts, adsorbents, deodorizing absorbents, humidity-controlling. agents, bases of medicament formulations and cosmetic preparations and so on. Furthermore, the amorphous silicic acid products are particularly suitable for use as a filtration aid by virtue of the high acid-resistance and high filtration coefficient.

In the following, the method of the present invention is described in more detail by way of Examples, which, however, never limit the scope of the invention in any way.

In the following Examples, the amorphous silicic acid products were evaluated for several items by the respective methods described below.

(1) Average Particle Diameter

Measurements were undertaken for the average particle diameter of the sample powder by using an automatic centrifugal particle size distribution tester.

(2) Bulk Density

An about 50 ml portion of the sample powder was taken in a measuring cylinder and, after gentle tapping to effect settling of the powder to establish an ultimate volume, the weight of the sample powder was divided by this ultimate volume of the powder bed to give a bulk density.

(3) Whiteness

Measurements were undertaken by using a trichromatic calorimeter.

(4) Specific Surface Area

A BET instrument for the determination of the specific surface area was used by the multi-point method in which nitrogen gas was adsorbed on the sample powder after thorough degassing by heating at 200° C.

(5) Acid Resistance

A 1.0 g portion of the sample powder was immersed in 200 ml of an aqueous hydrochloric acid solution having a pH of 1.2 and agitated therein for 1 hour at 50° C. followed by centrifugal solid-liquid separation. A spectrophotometric analysis was undertaken for the concentration of $SiO_2$ in the supernatant as a measure of the acid resistance.

(6) Ruth's Constant-Pressure Filtration Coefficient $K_{20}$

A value of the Ruth's constant-pressure filtration coefficient $K_{20}$ in cm$^2$/second, i.e. the value at 20° C., was determined for an aqueous slurry of Gairome clay having a pH adjusted to 2 with a body feed of the sample powder by using a pressurizable filter having a filtration area of 21.9 cm$^2$ at a filtration pressure of 0.5 kg/cm$^2$. The concentration of the Gairome clay in the aqueous slurry was 0.5% by weight and the mixing volume ratio F/C, i.e. the ratio of amorphous silicic acid/clay, was 0.5. A larger value of $K_{20}$ means a larger rate of filtration.

(7) Clarity of Filtrate

A fraction of the filtrate collected after 1 minute from the start of filtration in the filtration test (6) described above was subjected to the determination of the light transmissivity on a spectrophotometer taking the value with a shutter plate inserted to the optical path as 0% and the value for distilled water as 100%.

(8) Content of Silicic Acid

Analysis of the silicic acid content was undertaken by the method of fluorescent X-ray analysis.

EXAMPLE 1

An aqueous slurry was prepared by admixing a blend of an amorphous silicic acid powder having an average particle diameter of 0.03 μm and a calcium oxide powder in a molar ratio $CaO:SiO_2$ of 0.6 with 30 times by weight of water. The aqueous slurry was heated in an autoclave at 160° C. for 4 hours under agitation to give an aqueous slurry of calcium silicate.

The aqueous slurry was then filtered to give a wet cake which, as a whole, was admixed with a mixture of water and ethyl alcohol in such a weight ratio of water:alcohol of 30:70 taking into account the amount of water contained in the wet cake to give a slurry of which the liquid:solid ratio was 30 by weight. Acetic acid of 80% by weight concentration was added to the slurry in such an amount as to be sufficient to dissolve away any calcific constituent contained in the calcium silicate slurry and the slurry was heated at 80° C. for 5 minutes under agitation to effect decalcification.

In the next place, the slurry was thoroughly washed with water and subjected to filtration to give a wet cake which was dried by heating at 120° C. to give an amorphous silicic acid product.

The results of the evaluation tests of this amorphous silicic acid powder included:
average particle diameter of 4.95 μm;
bulk density of 0.061 g/cm$^3$;
whiteness of 96.88;
specific surface area of 684 m$^2$/g;
acid resistance of 6.53 mg/g;
Ruth's constant-pressure filtration coefficient $K_{20}$ of 0.1352 cm$^2$/second;
clarity of filtrate of 99.7%; and
silicic acid content of 99.2% by weight.

EXAMPLE 2

An aqueous slurry was prepared by admixing a blend of a crystalline silicic acid powder having an average particle diameter of 3.53 μm and a calcium oxide powder in a molar ratio CaO:SiO$_2$ of 0.6 with 30 times by weight of water. The aqueous slurry was heated in an autoclave at 160° C. for 4 hours under agitation to give an aqueous slurry of calcium silicate.

The aqueous slurry was then filtered to give a wet cake which, as a whole, was admixed with a mixture of water and ethyl alcohol in such a weight ratio of water:alcohol of 30:70 taking into account the amount of water contained in the wet cake to give a slurry of which the liquid:solid ratio was 30 by weight. While keeping the slurry at 50° C., carbon dioxide gas was blown into the slurry for 5 hours to effect carbonation of the calcific constituent and then hydrochloric acid of 18% by weight concentration was added to the slurry in such an amount as to be sufficient to dissolve away aconstitueic constituent contained in the slurry which was heated at 60° C. for 5 minutes under agitation to effect decalcification.

In the next place, the slurry was thoroughly washed with water and subjected to filtration to give a wet cake which was dried by heating at 120° C. to give an amorphous silicic acid product.

The results of the evaluation tests of this amorphous silicic acid powder included:
average particle diameter of 6.08 μm;
bulk density of 0.080 g/cm$^3$;
whiteness of 96.57;
specific surface area of 417 m$^2$/g;
acid resistance of 3.51 mg/g;
Ruth's constant-pressure filtration coefficient $K_{20}$ of 0.4767 cm$^2$/second;
clarity of filtrate of 99.5%; and
silicic acid content of 99.6% by weight.

EXAMPLE 3

An aqueous slurry was prepared by admixing a blend of a crystalline silicic acid powder having an average particle diameter of 7.77 μm and a calcium oxide powder in a molar ratio CaO:SiO$_2$ of 0.6 with 30 times by weight of water. The aqueous slurry was heated in an autoclave at 160° C. for 8 hours under agitation to give an aqueous slurry of calcium silicate.

The aqueous slurry was then admixed with acetic acid of 80% by weight concentration in such an amount as to be sufficient to dissolve away any calcific constituent contained in the slurry and the slurry was heated at 60° C. for 20 minutes under agitation to effect decalcification.

In the next place, the aqueous slurry was filtered to give a wet cake which was admixed with a mixture of water and ethyl alcohol in such a weight ratio water:alcohol of 40:60 taking into account the amount of water contained in the wet cake to give a slurry of which the liquid:solid ratio was 30 by weight. The slurry was heated at 70° C. for 20 minutes under agitation and then subjected to filtration to give a wet cake which was dried by heating at 120° C. to give an amorphous silicic acid product.

The results of the evaluation tests of this amorphous silicic acid powder included:
average particle diameter of 8.03 μm;
bulk density of 0.043 g/cm$^3$;
whiteness of 96.64;
specific surface area of 287 m$^2$/g;
acid resistance of 3.65 mg/g;
Ruth's constant-pressure filtration coefficient $K_{20}$ of 0.8961 cm$^2$/second;
clarity of filtrate of 99.2%; and
silicic acid content of 99.4% by weight.

EXAMPLE 4

An aqueous slurry was prepared by admixing a blend of a crystalline silicic acid powder having an average particle diameter of 7.77 μm and a calcium oxide powder in a molar ratio CaO:SiO$_2$ of 0.8 with 30 times by weight of water. The aqueous slurry was heated in an autoclave at 180° C. for 8 hours under agitation to give an aqueous slurry of calcium silicate.

The aqueous slurry of calcium silicate was subjected to a carbonation treatment by blowing carbon dioxide gas thereinto under a pressure of 2 kg/cm$^2$ G for 5 hours followed by filtration to give a wet cake which, as a whole, was admixed with a mixture of water and ethyl alcohol in such a weight ratio of water:alcohol of 30:70 taking into account the amount of water contained in the wet cake to give a slurry of which the liquid:solid ratio was 30 by weight. The slurry was admixed with acetic acid of 80% by weight concentration in such an amount as to be sufficient to dissolve away any calcific constituent contained in the slurry which was heated at 80° C. for 20 minutes under agitation to effect decalcification.

In the next place, the slurry was thoroughly washed with water and subjected to filtration to give a wet cake which was dried by heating at 120° C. to give an amorphous silicic acid product.

The results of the evaluation tests of this amorphous silicic acid powder included:
average particle diameter of 8.07 μm;
bulk density of 0.033 g/cm$^3$;
whiteness of 96.97;
specific surface area of 311 m$^2$/g;
acid resistance of 3.15 mg/g;
Ruth's constant-pressure filtration coefficient $K_{20}$ of 0.9578 cm$^2$/second;
clarity of filtrate of 99.2%; and
silicic acid content of 99.6% by weight.

What is claimed is:

1. A method for the preparation of amorphous silicic acid particles which comprises the steps of:

(a) subjecting a mixture of a siliceous material and a calcific material to a hydrothermal reaction in an aqueous medium to form an aqueous slurry of calcium silicate particles;

(b) bringing the calcium silicate particles into contact with a liquid medium, which is a mixture of water and a water-miscible organic solvent, containing an acid to effect decalcification of the calcium silicate particles leaving amorphous silicic acid particles; and (c) separating the amorphous silicic acid particles from the acidic liquid medium.

2. The method for the preparation of amorphous silicic acid particles as claimed in claim 1 in which the water-miscible organic solvent is selected from the group consisting of methyl alcohol, ethyl alcohol, propyl alcohol, butyl alcohol and acetone.

3. The method for the preparation of amorphous silicic acid particles as claimed in claim 1 in which the mixing ratio of the water-miscible organic solvent and water in the liquid medium in step (b) is in the range from 50:1 to 1:4 by weight.

4. A method for the preparation of amorphous silicic acid particles which comprises the steps of:
   (a) subjecting a mixture of a siliceous material and a calcific material to a hydrothermal reaction in an aqueous medium to form calcium silicate particles;
   (b) bringing the calcium silicate particles into contact with carbon dioxide in an aqueous medium to effect carbonation of the calcific constituent in the calcium silicate slurry;
   (c) bringing the calcium silicate particles after carbonation in step (b) into contact with a liquid medium, which is a mixture of water and a water-miscible organic solvent, containing an acid to effect decalcification of the calcium silicate particles after carbonation leaving particles of amorphous silicic acid; and
   (d) separating the amorphous silicic acid particles from the liquid medium.

5. The method for the preparation of amorphous silicic acid particles as claimed in claim 4 in which the water-miscible organic solvent is selected from the group consisting of methyl alcohol, ethyl alcohol, propyl alcohol, butyl alcohol and acetone.

6. The method for the preparation of amorphous silicic acid particles as claimed in claim 4 in which the mixing ratio of the water-miscible organic solvent and water in the liquid medium is in the range from 50:1 to 1:4 by weight.

7. A method for the preparation of amorphous silicic acid particles which comprises the steps of:
   (a) subjecting a mixture of a siliceous material and a calcific material to a hydrothermal reaction in an aqueous medium to form calcium silicate particles;
   (b) bringing the calcium silicate particles into contact with an aqueous medium containing an acid to effect decalcification of the calcium silicate particles leaving amorphous silicic acid particles;
   (c) bringing the amorphous silicic acid particles into contact with a liquid medium which is a mixture of water and a water-miscible organic solvent; and
   (d) separating the amorphous silicic acid particles from the liquid medium.

8. The method for the preparation of amorphous silicic acid particles as claimed in claim 7 in which the water-miscible organic solvent is selected from the group consisting of methyl alcohol, ethyl alcohol, propyl alcohol, butyl alcohol and acetone.

9. The method for the preparation of amorphous silicic acid particles as claimed in claim 7 in which the mixing ratio of the water-miscible organic solvent and water in the liquid medium is in range from 50:1 to 1:4 by weight.

\* \* \* \* \*